Figure 1:
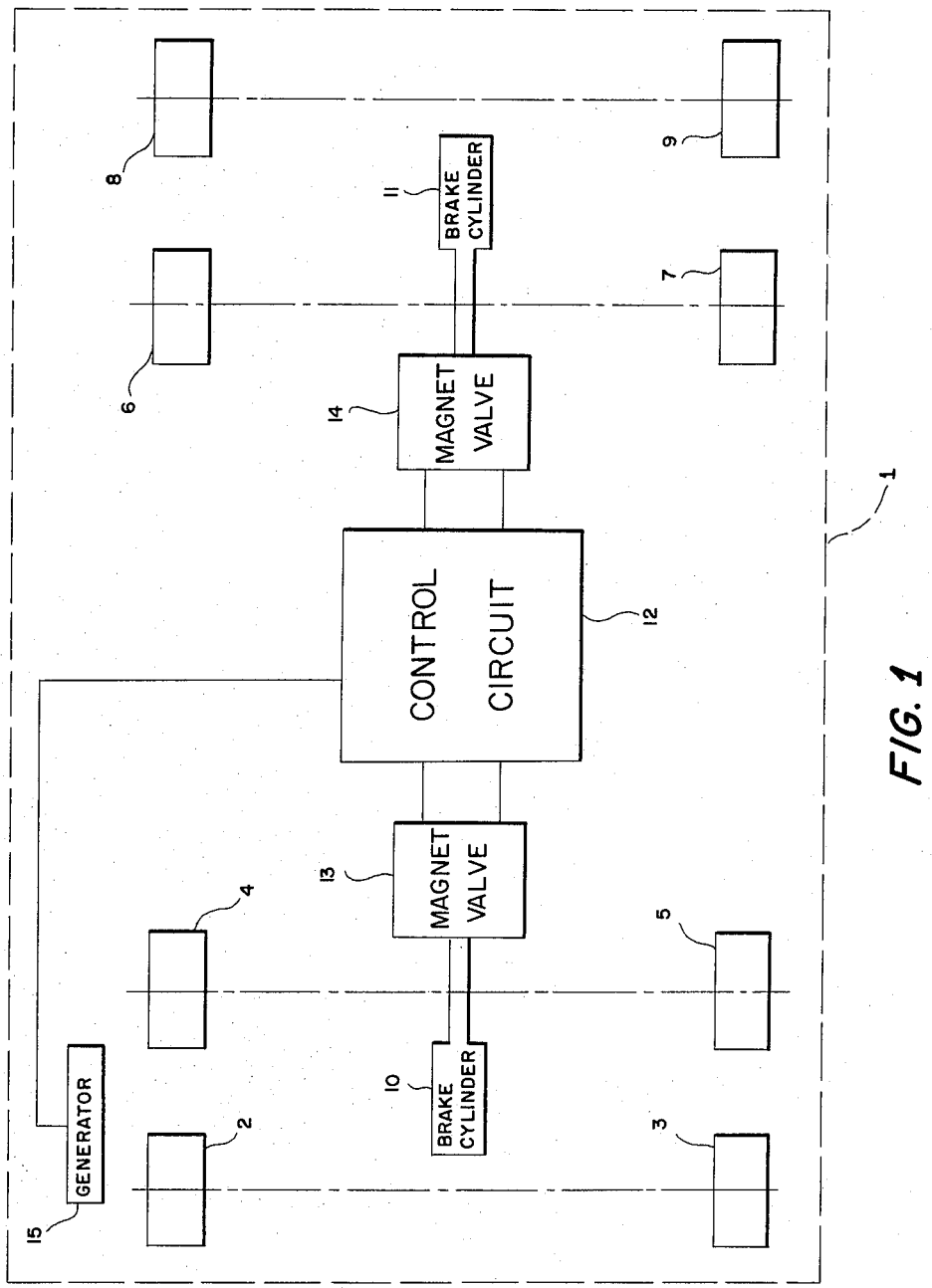

United States Patent Office 3,245,728
Patented Apr. 12, 1966

3,245,728
SPEED CHANGING SYSTEMS
William H. Brooks, London, England, assignor to Westinghouse Brake and Signal Company Limited, London, England
Filed Aug. 27, 1962, Ser. No. 219,575
Claims priority, application Great Britain, Aug. 29, 1961, 31,108/61
13 Claims. (Cl. 303—21)

This invention relates to speed changing systems and relates especially but not exclusively to a self-adapted braking system.

According to the present invention there is provided a system for providing a change of speed in a body from one speed to a predetermined different speed over a predetermined displacement, having means for deriving from said body a velocity signal representing a power of the instantaneous velocity thereof, means for deriving a displacement signal representing displacement thereof from a given point, means responsive to an instruction signal applied to the system at said point for initiating the application of a force to the body appropriate to the value of said velocity signal to produce a desired change of speed over a given displacement and means for subsequently modifying said force according to said velocity signal until said velocity signal is equal in magnitude to said displacement signal on a predetermined scale and thereafter modifying said force according to a function of said displacement signal.

Preferably, in a braking system in accordance with the invention, said means for modifying the force according to said displacement signal is also dependent upon the velocity of the body in order to tend to also modify the braking force applied in accordance with the inverse of the velocity.

In accordance with the invention, by deriving one or more signals coincidentially in time from a moving vehicle representing the state thereof, using one or more of these signals for instantaneous control of the vehicle and applying the remaining signal or signals to storage for subsequently modifying the control if necessary and arranging a predetermined relationship between such signals, the vehicle speed control can be made to be substantially self-adaptive to circumambient conditions.

Before the invention is described further it may be of assistance to consider an idealised braking system. Thus let it be assumed initially that it is desired to bring to rest a rail vehicle travelling at a given speed, the braking to take place over a given distance. This corresponds to the state of affairs existing when a rail vehicle travelling at maximum speed towards a station is given a signal at a given point along the track prior to a station platform indicating that the vehicle is required to stop at a predetermined position at the station platform. Assume also that on receiving the signal to stop a signal is derived from the vehicle wheels to indicate the speed thereof and a constant braking force is immediately applied which is just sufficient to bring the vehicle to rest at the desired position. Since the braking force is constant, the deceleration produced is ideally constant and the velocity against time curve is a straight line, the area under which is the desired braking distance. Supposing now that instead of travelling at maximum speed, the vehicle is travelling at a much lower speed, say half the maximum speed, when it receives the signal to stop. Again a constant braking force appropriate to the speed may be applied but it will be observed that in order that the vehicle shall cover the same braking distance, or in other words, to make the area under the velocity against time curve the same as before, the braking time is in this case doubled. In general therefore it may be said that a vehicle braked by a constant braking force dependent on initial speed, over a given distance takes longer to stop the slower the speed. This is clearly undesirable and even if it were possible, may be unacceptable to vehicle operators. In view of this a further idealised system may be envisaged in which on receiving a signal to stop, the vehicle is allowed to run on at the same speed for a distance which is determined by the speed of the vehicle, this distance being greater the slower the speed. After the predetermined distance from the point at which the signal to stop is received has been covered a braking force is applied, the value of which is again determined by the speed, to bring the vehicle to rest at the desired position. In this way, assuming that the braking forces applied are commensurate with limiting friction between the wheels and the track not being exceeded a vehicle is ideally brought to rest in the required distance in the shortest conceivably possible time.

By virtue of the nature of braking systems in general, it is impossible to determine the instant at which braking begins and what braking forces are applied initially and even if such a system were practicable a system operating on the lines of the foregoing is undesirable as the braking may in general be too abrupt from the passengers' point of view and in any case takes no consideration of the possibility of wheel slide occurring. Thus the time taken for bringing a vehicle to rest over a predetermined distance from the point at which a signal to stop is received cannot be determined by a simple straight line curve.

Considering now deceleration of a vehicle according to a law which gives deceleration proportional to the distance travelled from a given point on a route, the relationships are those pertaining to a simple harmonic motion and are well known. Thus, if the required stopping distance is K1, the initial velocity U, the distance variable is S and the time variable $t$, thus $$\text{Acceleration } (a) = -\frac{Us^2}{K_1^2} = \frac{U^2}{K} \sin \frac{U}{K} t \quad (t = \text{time})$$

$$\text{Velocity } (v) = \frac{U}{K_1} K^2 - S^2 = U \cos \frac{U}{K} t$$

$$\text{Displacement } (S) = \frac{K}{U} U^2 - V^2 = K \sin \frac{U}{K} t$$

These relationships form the basis of one form of braking system according to the invention although in a straight-forward system based on these relationships the time taken to stop a vehicle over a given distance is dependent upon the initial speed and is longer than is normally acceptable for lower speeds. Further, no easing back of the decelerating forces is provided as the vehicle comes to rest and no provision is made to take account of the time taken in the case of air-operated brakes for the air pressure to rise, nor for the exponential rise of braking force which occurs as the air pressure rises towards the value called for. In addition, no compensation is provided for varying co-efficients of friction between brake-blocks and wheels or track and wheels.

In the example of the invention to be described, it will be appreciated that it is inevitable that after a signal to stop a vehicle in a given distance is received, the vehicle travels a certain indeterminate distance before the brakes begin to be operative to produce any deceleration. It is proposed that the distance travelled by the vehicle from the point at which the signal to stop is received be recorded as a charge in a storage circuit. After some delay, deceleration forces begin to be applied and increase substantially exponentially towards a value which is predetermined according to the initial velocity of the vehicle. This exponential rise is a characteristic of the braking system itself and has nothing to do with the control system. During the consequent increase of deceleration, further distance is recorded on the storage circuit. The distance covered up to this point is solely dependent on the existing conditions of vehicle and track and is indeterminate. It is proposed in the example given that the retardation called for may be proportional to the square of the initial velocity, hence the control circuit supplies a current to a proportional magnet valve proportional to the square of the initial speed of the vehicle. As soon as braking begins, the current in the magnet valve changes with the square of the instantaneous velocity, the value always tending to be that which would ideally bring the vehicle to rest in the predetermined required distance. Thus as soon as the vehicle comes under the control of the brakes, the effect is subsequently one of brake easing-off as the velocity is reduced.

During the above process, the velocity signal, which in this case is proportional to the square of the velocity, is compared with a displacement signal similarly proportional to the distance travelled from the point at which the signal to stop is received. The velocity signal thus decreases in magnitude whilst the displacement signal is increasing in magnitude. When these two signals are equal, ideally a smooth transfer occurs from control of the braking force by the velocity signal to control of the braking force by the displacement signal. The velocity signal is greater, the greater the distance covered from the point at which a signal to stop is received to the point at which takeover to distance control occurs. Thus the greater the initial velocity, the greater is the braking force which is applied according to the distance law at takeover. The braking forces subsequently increase with distance covered towards the stopping point. It will be seen however from the following that the braking force called for by the specific system described, at this stage is also dependent upon an inverse velocity factor so that the distance control law is in fact a modified sine law rather than a simple harmonic law and by virtue of the nature of the control system which is proposed the braking force is eased back automatically in the vicinity of the stopping point thereby enabling a substantially jerk-free stop to be achieved.

Figure 2:
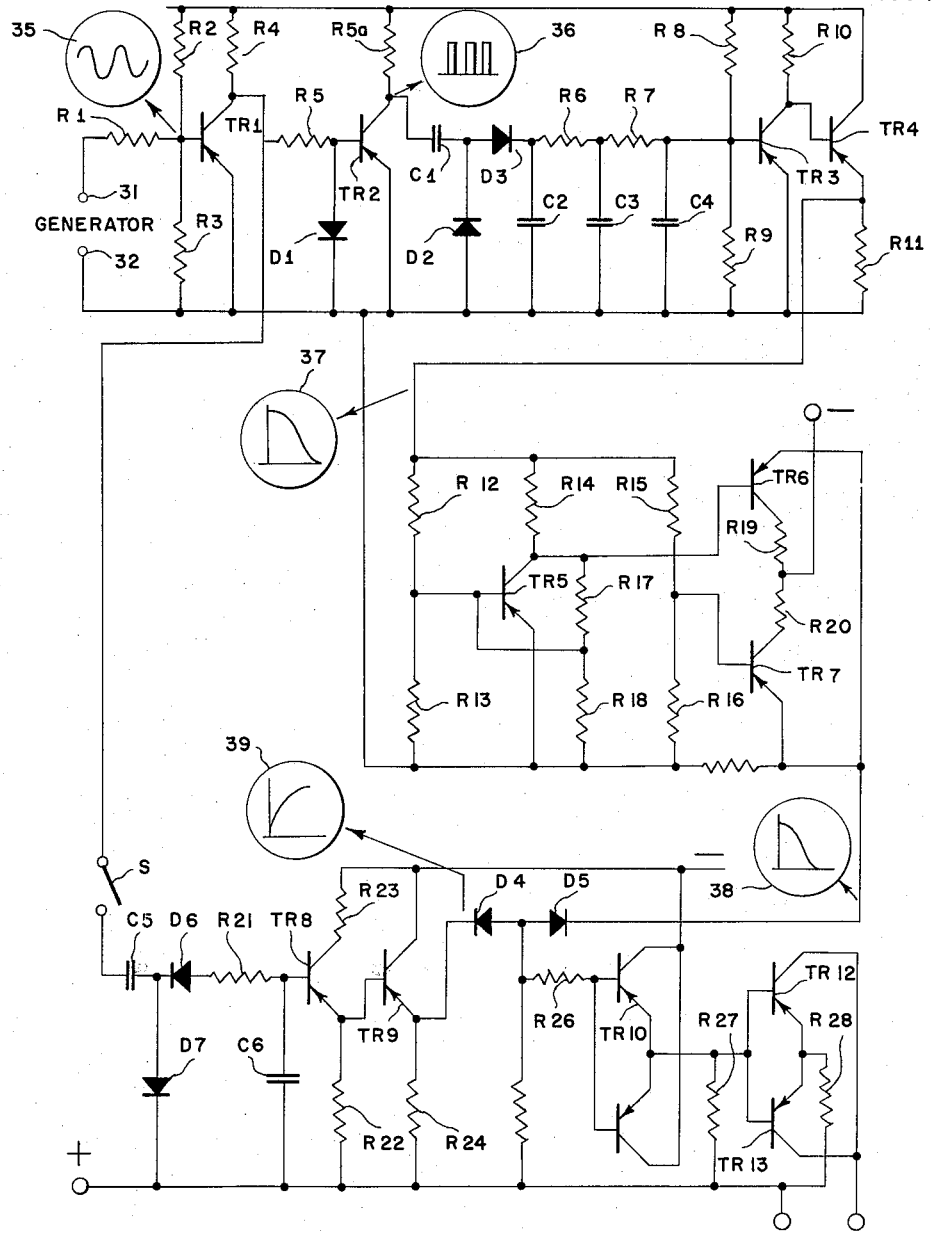

In order that the invention may be more clearly understood and readily carried into effect, the same will be further described with reference to the accompanying drawings in which:

FIGURE 1 illustrates in schematic form the arrangement of a braking system in accordance with the invention, and FIGURE 2 illustrates the circuit arrangement of a controller for use in a system according to the invention.

Referring to FIGURE 1, the broken line 1 represents the outline of a rail vehicle having four pairs of wheels comprising wheels 2, 3, 4, 5, 6, 7, 8 and 9, four forward and four rearward. It is assumed that this vehicle is part of a train of vehicles and the control system which it carries serves to control the operation of magnet valves on the other vehicles in the train to control the braking thereof. Each pair of wheels on the vehicle 1 is mounted solid with its axles so that there is no velocity differential between the wheels in each pair. Forward and rearward brake cylinders 10 and 11 are provided to supply the brake pressure requirements for the respective wheels in known manner, the actual brake mechanisms for each axle being omitted for simplicity. Block 12 represents the control circuit to be described in greater detail with reference to FIGURE 2 and associated with 12 are respective proportional magnet valves 13 and 14 which control the pressures applied to respective brake cylinders 10 and 11 in accordance with the braking pressures called for by 12. Also associated with 12 is an electromagnetic axle generator 15, which co-operates with the axle which carry 2 and 3 and provide an output waveform the frequency of which is proportional to the speeds of the respective axles.

In FIGURE 2, the wheel generator output to be utilised in the operation of the system is applied to terminals 31 and 32. Terminal 31 is connected via a resistor R1 to the juncture of a pair of resistors R2 and R3 connected across the supply, and to the base electrode of a p-n-p type transistor TR1 which operates as an amplifier section. The emitter electrode of TR1 is connected to the positive terminal of a suitable transistor power supply (not shown) at 32, and the collector electrode of TR1 is connected via a resistor R4 to the negative terminal of the transistor power supply at 30. The output of TR1 is derived from the collector electrode thereof and connected via a resistor R5 to the base electrode of a transistor TR2 which in conjunction with the diode D1, connected between the base electrode of TR2 and the positive supply lines, operates as a limiter to remove the negative half cycles of the sine wave and clip the positive half cycles to form a pulse wave form such as shown at 36.

The collector electrode of TR2 is coupled via a resistor R5a to the negative supply line and to one plate of a capacitor C1 which in conjunction with a succeeding pair of diodes D2 and D3 and a capacitor C2, is included in a diode pump type of circuit which has an appreciable leak characteristic so that its output voltage as presented across C2 represents the number of pulses per second received from TR2. This output from C2 requires a substantial degree of smoothing which is provided by resistors R6 and R7 and capacitors C3 and C4 as shown, in conventional manner. Capacitors C2, C3 and C4 are all electrolytic.

The output voltage appearing across C4 is applied to the junction of a pair of resistors R8 and R9 connected in series between the supply lines and also to the base electrode of a transistor TR3 having a collector resistor R10. The output of TR3 is coupled directly to the base electrode of a following transistor TR4 which has an emitter resistor R11 and operates as an emitter follower. TR3 and TR4 function merely as an amplifier to amplify the smoothed output from the diode pump arrangement.

The output from TR4 which is therefore proportional to the frequency of the applied signal at 31 and 32 and therefore to the velocity V, is applied as a driver via a potentiometer comprising two resistors R12 and R13, to the base electrode of a transistor TR5 and as a supply to TR5 via collector resistor R14. The output of TR4 is further applied across a potential divider comprising two resistors R15 and R16. Between the collector and emitter electrodes of TR5 there is connected a potentiometer made up of two resistors R17 and R18 which serve to provide a proportion of the output of TR5 as a feedback signal to the base electrode of TR5 so that the latter operates as a logarithmic amplifier. The logarithmic output of TR5 is applied to the base electrode of one transistor TR6 of a difference amplifier the base electrode of the other transistor TR7 of which is connected to the junction of R15 and R16. TR6 and TR7 are arranged in series in known manner as shown with collector resistors R19 and R20. This difference amplifier therefore produces an output signal which is proportional to the difference between the linear signal across R16 and the logarithmic signal produced by TR5. Since the logarithmic series contains a squared term the output of the differencing amplifier, within certain limits, is proportional to the square of the output of TR4, that is it is proportional to $V^2$. This signal is applied to the "cathode" of a diode D5.

In addition to being coupled to TR2 the output of TR1 which consists of positive half cycles of the wheel generator waveform, is coupled via an initiation switch S to a further diode pump circuit comprising capacitor C5, diode D6, diode D7, resistor R21 and a capacitor C6. This diode pump is so arranged as to have a controlled bleed, fixed by the input impedance of the following transistor TR8 to be negligible for high rates of pulse at C5 but appreciable for lower rates. The purpose of this will be appreciated hereafter.

The switch S is a switch of any suitable known form and is operated to the closed position by a ramp disposed between the rails at the initiation point to engage with a lever which engages the ramp as the train passes over it, the lever being mechanically coupled to the switch S. The switch S is released by an electrical unlatching arrangement which is energised when the train controls are operated to cause the train to start up again under power. The mode of operation of S needs no further description as it does not form the basis of the invention and it will be understood that any other form of operation such as a photoelectric or electromagnetic tripping means may be employed.

Transistor TR8 has an emitter resistor R22 and a collector resistor R23 and a signal appearing at the emitter of TR8 is applied to the base electrode of a further transistor TR9 which amplifies the integrated output of TR8. Transistor TR9 operates as an emitter follower and the output is fed to the "cathode" of a further diode D4 which is arranged in opposition to D5 to form therewith a comparator. Thus whichever of the signals applied to D5 and D4 has the greater magnitude is transmitted to the resistor R25 connected between the junction of D4 and D5 and the positive supply line.

The signal thus appearing across R25 is applied via a resistor R26 to the base electrode of two transistors TR10 and TR11 connected to form a driver stage in the final amplifier of the arrangement. The output derived from the common emitter of this amplifier is presented across a resistor R27 and applied to the base electrodes of the transistors TR12 and TR13 of the power output stage of this amplifier the power from which stage is employed to operate the proportional magnet valves for the different vehicles in the train.

Referring in greater detail to the operation of the circuit arrangement of FIGURE 2, the wheel generator signal which is of the form shown at 35, and the frequency of which is proportional to the velocity of the train relative to the track is amplified by the transistor TR1 and limited by the combination of the diode D1 and transistor TR2 to produce as aforementioned, an approximately square wave output as shown at 36. The frequency of the square wave pulses is a measure of the instantaneous velocity of the vehicle and this frequency is converted into an analogue signal by means of the diode pump type arrangement comprising C1, D2, D3 and C2, which operates as a counting discriminator circuit, the smoothed output of which is amplified by TR3 and TR4. The current output of TR4 over the braking operation is therefore somewhat as shown at 37 and this signal is squared by means of the arrangement comprising TR5, R15, R16, TR6 and TR7 as described in the foregoing, to produce an output $V^2$ which over the braking operation is of the form shown at 38.

When the train passes the point at which braking is to be initiated, the switch S which is shown in the open position is closed and the diode pump circuit comprising C5, D6 and C6 operates in known manner as a numerical adder and begins to store charge on the capacitor C6 representative of the distance travelled from the initiation point until the braking control transfers to so called distance control. The voltage on C6 representing S or distance modified by V, as the case may be, is therefore amplified by TR8 and TR9 to produce an output over the braking operation of the form shown at 39.

The scale of proportionality of the signals representing V squared and S, as applied to D5 and D4 respectively, is arranged on the assumption of a linear deceleration law from the initiation point to the stopping point and selecting the circuit component values accordingly. Thus initially, assuming of course that the vehicle is travelling, the signal proportional to $V^2$ is always greater than that representing S so that the signal applied via R26 to the base electrodes of TR10 and TR11 is the signal proportional to $V^2$. The sooner the braking pressure, which this signal commands via the proportional magnet valves in the vehicles of the train, is effective to slow the vehicle, the faster does the signal proportional to $V^2$ reduce in value and the shorter is the distance travelled before this signal is equal to the signal proportional to S. At this instant and thereafter the signal which is applied to the base electrodes of TR10 and TR11 is the signal proportional to S and the pressures commanded by the proportional magnet valves begin to operate to slow the train still further in a controlled manner.

Although referred to as a signal proportional to S, the signal applied via D4 is, as mentioned earlier, a signal proportional to S modified by an inverse velocity factor which becomes more and more effective as the velocity reduces. This modification is desirable because the brake-block coefficients in practice increase as the peripheral wheel velocities reduce so that it is necessary to provide some means of easing back the braking pressures. Also the modification has the effect of reducing slip on the wheels from which the axle generator operates as any tendency to slip is accompanied by a reduction of braking pressure. The modification is achieved moreover by virtue of the nature of that part of the circuit which produces the signal proportional to S. The capacitor C6 has in practice a bleed factor which, although it is negligible for relatively high speeds owing to the then high rate of application of burts of charge thereto, it gives rise to a run down of charge near the lower speed end of the braking curve.

The bleed-factor is thus effective to cause a levelling out in the S-curve 39 as the train speed is reduced and then also to cause a tailing off towards standstill when the bleed from C6 overrides the incoming charge. This has the convenient effect, referred to previously, of causing a substantially jerk-free stop.

It should also be noted that under poor braking conditions, when the change from $V^2$ control to S control would take place later than under good conditions, the absence of the inverse velocity factor would tend to decrease the stopping distance. Therefore in addition to the smoother stop, incorporation of the inverse velocity factor provides more accurate control of the point at which the train stops.

When the train has been brought to rest, sufficient time elapses before another brake initiation for the charges on C6 and C2 to substantially leak away and the switch S which rendering closed is opened as described earlier when the train controls cause the train to move again under power. Hence the circuit is ready on reception of the next brake initiation signal from a track side ramp, to be set into operation as described.

It will be appreciated that with the above proposed system, although what actually happens when the brakes of a train are applied is substantially unpredictable as regards the many variables which exist, on initiation of a braking operation, the braking pressure is called for according to the square of the initial velocity and until the brakes begin to become effective this pressure continues to be called for. When the train comes under the control of the brakes, the velocity tends to reduce so the braking pressure tends to be eased off to the point where the $V^2$ signal is equal to the accumulated S signal. The system is then self adaptive to at least some of the subsequent important variables such as the block coefficients to bring the train to rest within limits of the desired distance from the initiation point.

The embodiments of the invention in which an exclusive property or privilege is claimed are defined as follows:

1. A system for providing a change of speed of a body over a predetermined distance of travel along a route from its existing speed to a predetermined speed, including means for applying a control signal to the body at a predetermined point on said route, control means responsive to said signal for causing the application of speed changing forces to the body, said control means including means for generating a distance signal representative of distance travelled from said point, means for generating a velocity signal representative of a power of the instantaneous velocity of the body along the route, and means responsive to said control means for calling up a force, the value of which is dependent upon the velocity signal, a comparison device for comparing the distance signal and the velocity signal such as to maintain the control of said force in accordance with the velocity signal until the distance signal attains a predetermined relationship therewith, the control means then being such as to effect control of said force in accordance with the distance signal.

2. A system for providing a change of speed of a body over a predetermined distance of travel along a route from its existing speed to a predetermined speed, including means for applying a control signal to the body at a predetermined point on said route, control means responsive to said signal for causing the application of speed changing forces to the body, said control means including means for generating a distance signal representative of distance travelled from said point, means for generating a velocity signal representative of a power of the instantaneous velocity of the body along the route, and means responsive to said control means for applying speed changing force to said body having a value dependent upon the magnitude of a control signal, said control means including comparator means for comparing said distance signal and said velocity signal and for emitting a control signal proportional to said velocity signal until said distance signal attains a predetermined relationship therewith, and thereafter a control signal proportional to said distance signal.

3. A system for providing a change of speed of a body over a predetermined distance of travel along a route from its existing speed to a predetermined speed including control means, force applying means, said control means having means for applying thereto a signal at a predetermined point on said route, said control means including means for generating a distance signal representative of the distance travelled by said body from said point, said control means including means for generating a velocity signal representative of a power of the instantaneous velocity of said body along the route, said control means including comparator means for comparing said distance signal and said velocity signal and for emitting a control signal proportional to said velocity signal, until said distance signal attains a predetermined relationship therewith and thereafter for emitting a control signal proportional to said distance signal, said force applying means responsive to said emitted control signal of said control means for applying a speed changing force to said body proportional to said emitted signal.

4. A system as set forth in claim 3, wherein said means for generating a distance signal generates a signal proportional to the distance from said point.

5. A braking system as claimed in claim 4 wherein the scale of proportionality between the distance signal and the velocity signal is determined in accordance with said function of said distance signal assuming the stopping is performed completely in accordance with the function of said distance signal whereby the braking force called for at the instant when the velocity signal and the distance signal are equal in magnitude gives a substantial smooth transition.

6. A system as set forth in claim 3, said control means further including means for applying a signal representative of the instantaneous velocity of said body to said distance signal generating means whereby when said speed changing force is a braking force occurring in response to a control signal emitted in response to said distance signal, said distance signal will be modified in accordance with a function of the instantaneous velocity.

7. A system as claimed in claim 3 wherein said velocity signal is a signal proportional to the square of the instantaneous velocity of the body.

8. A system as claimed in claim 3 wherein said means for generating a velocity signal includes a wheel generator which produces an electrical waveform the frequency of which is proportional to the angular speed of a wheel on the body.

9. A system as claimed in claim 8, wherein said control means includes means for deriving pulses corresponding to the half cycles of said electric waveform only and a counting discriminator for producing a direct voltage signal proportional to the instantaneous frequency thereof.

10. A system as claimed in claim 9, wherein the output of said counting discriminator circuit is applied to a squaring circuit arrangement.

11. A system as claimed in claim 10 wherein said squaring circuit arrangement comprises a logarithmic amplifier and a linear amplifier to both of which said direct voltage signal is applied and means for producing the difference between the output of said amplifiers.

12. A system as claimed in claim 8 wherein said means for generating a distance signal comprises a counting circuit for producing a stored signal proportional to the number of cycles in said electrical waveform following reception of the initiation signal at said predetermined point.

13. A system as claimed in claim 12, wherein said counting circuit comprises a diode pump circuit the storage capacitor of which is connected to a circuit the input impedance of which is so chosen as to give an insignificant bleed from the capacitor when applied pulses are of relatively high frequency but to give a significant bleed when applied pulses are of lower frequency to introduce a bleed factor which is dependent upon the inverse of the velocity of the body when the braking force is determined according to the function of displacement.

References Cited by the Examiner

UNITED STATES PATENTS

| | | | |
|---|---|---|---|
| 1,351,822 | 9/1920 | Williamson et al. | 246—182 X |
| 3,041,449 | 6/1962 | Bingen | 246—182 |

EUGENE G. BOTZ, *Primary Examiner.*